(12) United States Patent
Batty et al.

(10) Patent No.: US 6,884,280 B2
(45) Date of Patent: Apr. 26, 2005

(54) HEAT TRANSFER IN HEAP LEACHING OF SULPHIDE ORES

(75) Inventors: John de Klerk Batty, Randburg (ZA); Alan Norton, Randburg (ZA)

(73) Assignee: Billiton SA Limited, Randburg (ZA)

(*) Notice: Subject to any disclaimer, the term of this patent is extended or adjusted under 35 U.S.C. 154(b) by 77 days.

(21) Appl. No.: 10/402,299

(22) Filed: Mar. 28, 2003

(65) Prior Publication Data

US 2003/0167879 A1 Sep. 11, 2003

Related U.S. Application Data

(63) Continuation of application No. 10/402,299, filed on Mar. 28, 2003, which is a continuation of application No. PCT/ZA01/00154, filed on Oct. 5, 2001.

(30) Foreign Application Priority Data

Oct. 6, 2000 (ZA) .......................................... 2000/5462

(51) Int. Cl.[7] .............................................. C22B 3/18
(52) U.S. Cl. .............................. 75/712; 75/743; 75/744
(58) Field of Search ........................... 75/712, 743, 744

(56) References Cited

U.S. PATENT DOCUMENTS

| 3,997,405 A | 12/1976 | Muller et al. |
| 4,003,160 A | 1/1977 | Müller |
| 6,096,113 A | 8/2000 | Schaffner et al. |
| 6,110,253 A | 8/2000 | Kohr et al. |
| 6,149,711 A | * 11/2000 | Lane ............................ 75/712 |
| 6,626,979 B1 | * 9/2003 | Marsden et al. .............. 75/739 |

FOREIGN PATENT DOCUMENTS

EP 0 400 829 A 12/1990

OTHER PUBLICATIONS

Database WPI, Section Ch, Week 199114, Derwent Publications Ltd., London, GB; AN 1991–094597, XP002203793 & AU 60837 90 A (Austral Nuclear Sci), Feb 14, 1991 abstract.

* cited by examiner

*Primary Examiner*—Melvyn Andrews
(74) *Attorney, Agent, or Firm*—Brinks Hofer Gilson & Lione; G. Peter Nichols

(57) ABSTRACT

A method of leaching sulphide mineral concentrates wherein heat generated by bioleaching of sulphide mineral concentrates in at least one reactor is transferred into a heap in which bio-assisted leaching takes place.

22 Claims, 3 Drawing Sheets

HEAT TRANSFER IN HEAP LEACHING OF SULPHIDE ORES

This application is a continuation of U.S. Ser. No. 10/402,299 filed Mar. 28, 2003, which is a continuation of Application No. PCT/ZA01/00154, filed Oct. 5, 2001 (published in English on Apr. 11, 2002), which claims priority to ZA 2000/5462 filed Oct. 6, 2000, the entire contents of each are incorporated herein by reference.

BACKGROUND OF THE INVENTION

This invention relates generally to the leaching of sulphide concentrates. Commercial bio-assisted heap leaching plants which are currently in operation treating mineral bearing sulphide ores such as secondary copper sulphide ores typically operate at temperatures in the range of 10° C. to 25° C. and rely on the exothermic oxidation of sulphide minerals to keep the temperature of the heap above ambient conditions. Addition of heat to the heaps by the burning of fuels is generally prohibitively expensive and, economically, is usually not justifiable, although some operations use heat generated during the thermal production of electricity to supplement heat generated within the heap.

Heap leaching carried out at relatively low temperatures, i.e. at a temperature of up to 25° C., limits the rate of sulphide mineral oxidation that can be achieved. The use of high temperatures increases the rate of sulphide mineral leaching. High temperatures, well above 25° C., may be achieved autogenously within the heap because of the exothermic oxidation of a high sulphide content in the ore.

Ores often do not contain very high levels of sulphide because the copper sulphide minerals are quite low in concentration. Although iron sulphides such as pyrrhotite and pyrite may also be present and undergo exothermic oxidation these are generally in low concentration as well.

Certain ores such as chalcopyrite ores cannot be leached at low temperatures. If the ore is low in concentration then sufficient heat will not be generated by exothermic oxidation to enable heap leaching to take place at all.

Bio-assisted heap leaching, as opposed to milling and flotation of copper sulphides to produce a copper concentrate, is the only economic process available, known to the applicant, for treating low-grade sulphide ores.

SUMMARY OF THE INVENTION

The invention provides a method of leaching sulphide mineral concentrates wherein heat energy generated by bioleaching of sulphide mineral concentrates in a reactor is transferred into a heap in which bio-assisted leaching takes place. By transferring heat energy to the heap the temperature of the heap is raised and the rate of sulphide mineral oxidation within the heap is increased. Use may be made of two or more reactors.

The temperature within the heap may be raised in order to optimise the leaching rate under the prevailing conditions. Thus the amount of heat, i.e. energy transferred to the heap in which bio-assisted leaching takes place may be related to the volume of the heap, or vice versa, to allow the temperature of the heap to be increased to optimise the leaching rate. In the aforementioned process account may be taken of the heat energy which is released in the heap due to bio-assisted leaching of the heap taking place.

Apart from increasing the leaching rate in a heap, due to the higher prevailing temperature, it may also be possible to leach minerals, e.g. chalcopyrite, which are not susceptible to leaching at lower temperatures. For example a chalcopyritic ore heap may be maintained at a temperature in excess of about 60° C. to enable leaching to take place using extreme thermophile microorganisms.

Heat energy from the reactor may be transferred into the heap in any suitable way and the invention is not limited in this regard. For example, in one form of the invention, fluid from the heap passes through one or more heat exchangers e.g. cooling coils in the reactor. The said fluid may be a liquid and in one example of the invention is raffinate from a plant used to treat pregnant liquid solution from the heap and after heating the raffinate is returned to the heap as a lixiviant. The plant may be solvent extraction and electrowinning plant. It is also possible to transfer heat energy from the reactor to the heap using a gaseous medium e.g. air.

In a different form of the invention heat energy is extracted from the reactor in a suitable medium and is transferred from the medium through one or more heat exchangers to a fluid which is passed into or through the heap. The fluid may be gaseous e.g. air, the temperature of which is raised by means of heat generated in the reactor, and the air is then directed into the heap to raise its temperature.

In a different form of the invention the fluid is liquid. In one example the liquid is raffinate produced by solvent extraction techniques applied to the heap and the raffinate, once heated, is returned to the heap as a lixiviant.

According to a different method of the invention water is passed through at least one cooling coil situated in the reactor and heated water produced thereby is mixed with a solvent extraction raffinate from the heap to form a lixiviant for a bio-assisted heap leach. The volume of solvent extraction raffinate may be insufficient for, or surplus to, the requirement for complete heat energy transfer to maintain the reactor temperature at a desired level. In the former case the reactor may be partially cooled using water. In the case of a plurality of reactors some of the reactors may be cooled using water. The heated water may be placed in a closed circuit with a cooling tower or cooling mechanism or used as make-up water for a bio-assisted heap leach process.

If the volume of solvent extraction raffinate is surplus to the requirement for complete heat transfer then some of the raffinate may be passed directly to the bio-assisted heap leach, with the balance being used for the heat transfer out of the reactor.

The reactor may be an agitated tank reactor, and may be one of a plurality of similar reactors which are used in the method of the invention. The temperature at which the reactor is operated and the volume of the reactor are material factors, together with the volume of the heap, in determining the operating temperature of the heap. Preferably the reactor is operated using extreme thermophile microorganisms at a temperature in excess of 60° C. The temperature may for example lie in the range of from 60° C. to 80° C.

The bio-assisted heap leach is operated at the maximum possible temperature, using microorganisms which can operate at the prevailing temperature. For chalcopyrite ores for example the temperature within the heap should be maintained above 60° C.

The invention is not limited in application to the leaching of a particular sulphide mineral. For example the invention may be applied to the leaching of copper, nickel, zinc and gold or other sulphide concentrates.

Normally heat generated by leaching of a particular mineral type, say copper, in a reactor will be transferred to a heap wherein the same mineral (copper in this case) is leached. This, however, is not necessarily the case for a first mineral could be leached in a reactor and a second mineral, different from the first, could be leached in a heap.

There are various possible combinations of the temperature in the heap, and the operating temperature in the reactor, and the microorganisms used for leaching, according to the prevailing conditions. The reactor may for example be leached at a temperature of up to 45° C. using mesophile microorganisms and, in this event, the heap may be maintained at a temperature of say up to 40° C., with leaching taking place in the heap using mesophile microorganisms.

If the tank is operated at a temperature in the range of from 45° C. to 60° C. then, within the tank moderate thermophile microorganisms may be used while, in the heap, which is at a lower temperature, mesophile or moderate thermophile microorganisms may be used. If the tank is operated at a temperature in the range of from 60° C. to 80° C. then extreme thermophilic microorganisms may be used in the tank while in the heap, in which a lower temperature prevails, use may be made of moderate or extreme thermophile microorganisms.

In a preferred embodiment, particularly suited for the leaching of chalcopyrite, the reactor is operated at a temperature at or in excess of 68° C. using extreme thermophile microorganisms. This approach enables the heap to be operated at a temperature of above 60° C. using, for example, extreme thermophile microorganisms.

BRIEF DESCRIPTION OF THE DRAWINGS

The invention is further described by way of non-limiting examples with reference to the accompanying drawings, FIGS. 1 to 3, which respectively illustrate different embodiments of the invention.

DESCRIPTION

General Principles

Figure 1:
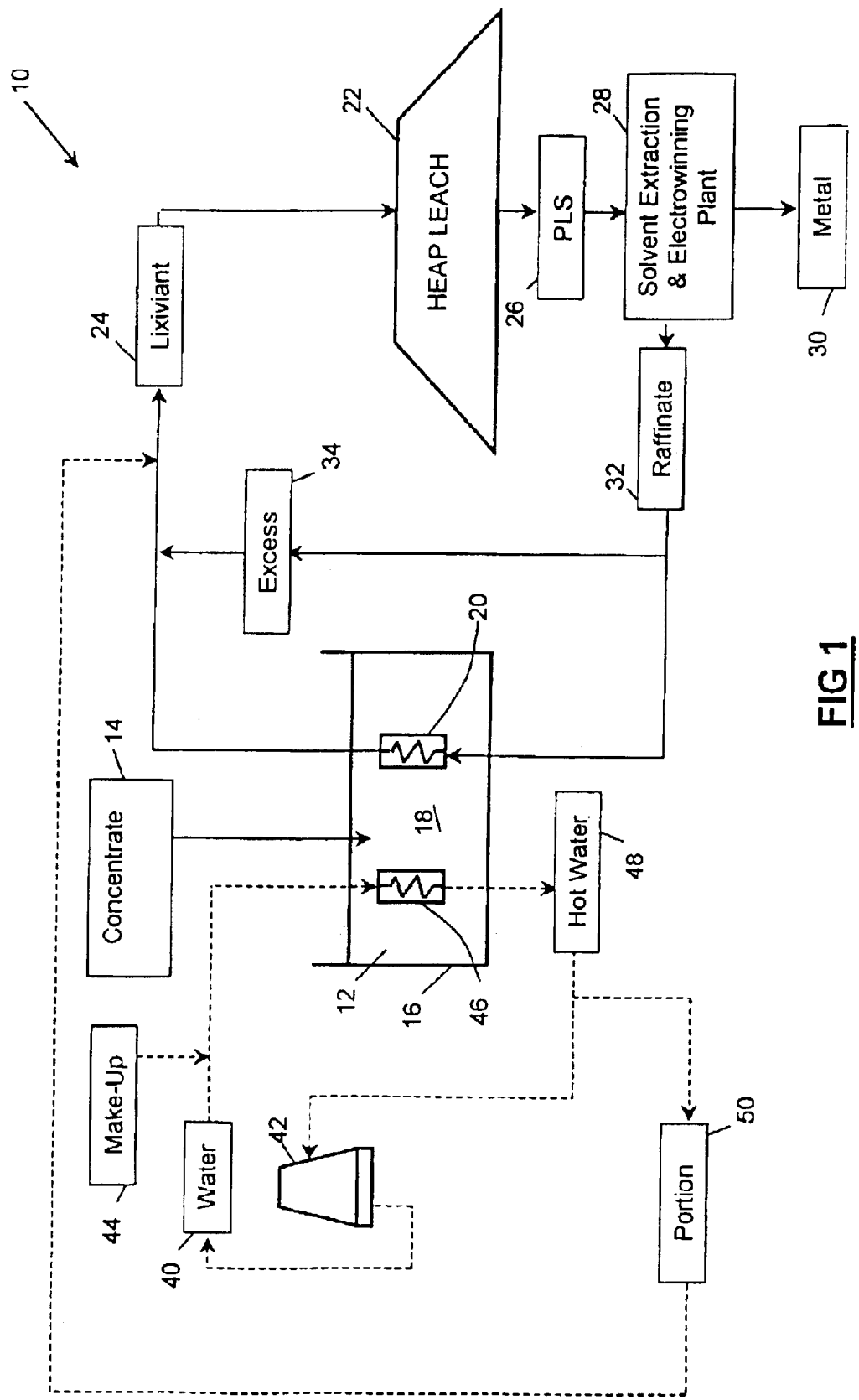
FIG. 1 illustrates a process in which bioleaching of sulphide mineral concentrates and heap leaching of metal bearing sulphide ores are carried out in accordance with the principles of the invention.

The oxidation of sulphide minerals is a highly exothermic reaction and, in commercial bioleaching, in an agitated reactor using mesophile microorganisms, the heat which is generated must be removed from the reactor. This is usually accomplished using cooling water which is passed through cooling coils in a closed circuit with a cooling tower. There is normally no use for the waste heat for it is low grade being contained in water at about 30° C.

Thermophile plants also produce large quantities of waste heat although the temperature of the cooling water emanating from such plants may be higher because of the higher temperatures used in a thermophile system, typically at a temperature in the range of from 60° C. to 80° C. Thus the waste heat from a thermophile plant, although still of a low grade, is significantly better than that arising from a mesophile plant.

In a bio-assisted heap leaching operation applied for the recovery of copper a copper bearing solution from the heap is typically passed through a solvent extraction and electrowinning process. The solvent extraction raffinate is returned to the heap as a lixiviant for further leaching of the copper sulphide minerals. A major problem with an operation of this type is the low temperature of the heap leaching lixiviant which greatly impedes the rate dissolution of the sulphide minerals. A well-known operation at Quebrada Blanca for example has a lixiviant temperature in the range of from 22° C. to 24° C. and a typical leaching time of about 300 days. Some heat is added to the lixiviant during percolation through the heap as a result of the exothermic dissolution of sulphide minerals. Heat is also lost by radiation from the heap and evaporation of the lixiviant.

In a number of operations heap leaching takes place in areas which have relatively cold environments and it is then more difficult to achieve a relatively high temperature within an operating heap.

The low temperatures which are associated with bio-assisted heap leaching are, generally, a result of a low sulphide content in the ore which implies that the amount of heat energy per unit volume generated by the leaching process is also low. Thus the temperature in the heap is primarily determined by the sulphide content of the ore in the heap.

The invention makes use of the exothermic heat of reaction generated in the oxidation of sulphide concentrates in an agitated bioleaching reactor to increase the temperature of a heap leaching lixiviant and therefore the temperature within the heap. Theoretically an increase in the lixiviant temperature of 10° C. will roughly halve the leaching time. Although in practice other factors may limit the leaching rate it is the applicant's view that higher temperatures will significantly increase leaching rates achieved during bio-assisted heap leaching.

An increased leaching rate produced as a result of a higher operating temperature within the heap will reduce the work-in-progress component of a typical heap leach operation as well as reduce the area required for the heap leaching process. A quicker realisation of the full production rate revenue will also be achieved.

The applicant has established that an in situ power generation of around 50 W/m$^3$ is required to achieve temperatures suitable for thermophilic microorganisms that operate at temperatures above 60° C. In approximate terms this means that ore containing about 6% to 7% S$^{2-}$ would have to be oxidised over a period of two years. Ores for bio-assisted heap leaching usually contain far less sulphide than this, typically 1.5% S$^{2-}$, and these low-grade ores give an in situ power generation of only about 14 W/m$^3$ when the sulphides are oxidised over an eighteen month period.

For example a heap leach operation processing 10 million tonnes per annum of a secondary copper sulphide ore, producing about 100000 tonnes per annum of copper, may require a leach period of around 18 months and an area under leach of about 1.4 million m$^2$. The volume of ore under leach would be about 10 million m$^3$. The temperatures within the heap would not be very high, typically less than 20° C., because of the low sulphide content of the ore of about 1.5% S$^{2-}$.

An agitated tank bioleaching plant processing a copper concentrate with 35% sulphide sulphur, producing about 100000 tonnes per annum of copper, would produce in the order of 90 MW of waste heat. If this heat were to be evenly distributed within a heap then the equivalent calculated heat input for different heap volumes is shown in Table 1.

TABLE 1

| Heap Volume Million m³ | Equivalent Power input W/m³ |
|---|---|
| 1 | 90 |
| 2 | 45 |
| 4 | 23 |
| 8 | 11 |

In this example if the reaction rate were to be increased threefold by operating at a substantially higher temperature then the area and volume of the heap under irrigation would be reduced by a factor of three. The heap volume would then amount to about 3.3 million m³, with the area under irrigation reducing to around 0.5 million m².

The total heat within the heap comes from distributing the heat load of the agitated tank bioleach plant within the heap, as well as from the exothermic heat of reaction resulting from the oxidation of the sulphide in the ore. The heat load from the agitated tank bioleach is equivalent to approximately 27 W/m³ power input to the heap. As the energy from the sulphide oxidation process is released over a third of the time period which would otherwise be taken, the power input to the heap increases by a factor of three to approximately 42 W/m³. The total power input is thus approximately 27+42=69 W/m³ which is well in excess of the 50 W/m³ required for a heap temperature in excess of about 60° C.

The reduction of area under irrigation by a factor of 3 in the preceding example gives rise to the following benefits:

(a) a reduced pad area capital cost which can generate a saving of from US$3 million to US$10 million depending on stacking and reclaiming arrangements;

(b) a reduction in working capital which can be as high as from US$10 million to US$30 million depending on the cost of mining, crushing and stacking;

(c) the full production rate revenue will be achieved far earlier; and (d) a reduction in the irrigation area of the heap reduces the volume that the solvent extraction plant is to handle by as much as 66%.

If the heat load from the agitated bioleaching reactor is sufficient to maintain the heap temperature above 60° C. then the bio-assisted heap leaching of low-grade chalcopyrite ores becomes possible. For example crushing, milling and flotation to produce a chalcopyrite concentrate may be used to treat a higher-grade portion of a chalcopyritic copper orebody. The chalcopyrite concentrate is leached in an agitated tank bioleaching reactor and the waste heat may, according to the method of the invention, be applied to a lower-grade portion of the same orebody, suitably crushed, in a heap leach. It therefore becomes possible to recover copper from low-grade ore, previously regarded as being uneconomic.

The exact benefit depends on the grade-tonnage profile of the orebody but could be substantial in many instances, particularly where there are large quantities of ore at or just below the cut-off grade for conventional milling, flotation and agitated tank bioleaching.

Particular Examples

FIG. 1 of the accompanying drawings illustrates a plant 10 in which bioleaching of sulphide mineral concentrates and heap leaching of metal bearing sulphide ores are carried out in accordance with the principles of the invention.

The plant 10 includes an agitated tank bioleach reactor 12 which processes a sulphide concentrate 14. The reactor 12 may be one of a plurality of similar reactors although, for convenience, only one reactor is illustrated in the drawing.

The reactor 12 includes a tank 16 which contains the sulphide slurry 18. One or more cooling coils 20 are immersed in the slurry.

The reactor 12 is positioned at a location which is preferably geographically as close as possible to a site at which a heap 22 of metal bearing sulphide ore is leached. In the heap leaching process a lixiviant 24 is fed to the heap and allowed to percolate downwardly through the heap in a manner and for a purpose which are known in the art. Pregnant liquid solution 26 is collected from the heap and is fed to a solvent extraction and electrowinning plant 28 which produces metal 30 and a solvent extraction raffinate 32 in accordance with techniques which are known in the art.

In this example of the invention the raffinate 32, which is at a relatively low temperature, is directed through the cooling coils 20 to extract heat from the slurry 18 in the tank. This heat is produced by the oxidation process which takes place in the tank, as has been described hereinbefore.

The heat transfer process, which takes place through the medium of the cooling coils, heats the raffinate which is then returned as lixiviant 24 to the heap 22. As has been indicated in the preceding general description considerable energy is released in the form of heat by the leaching operation in the tank 16. By warming the lixiviant, using this heat energy, the temperature of the heap 22 is increased with a result that the leaching process in the heap is accelerated. This brings about the benefits which have been referred to hereinbefore.

If the flow of solvent extraction raffinate 32, from the heap 22, is higher than that required in the cooling coils 20, then the excess 34 of the solvent extraction raffinate bypasses the cooling coils circuit and is added directly to the lixiviant flow to the upper zone of the heap.

On the other hand the flow of solvent extraction raffinate 32 from the heap may not be sufficiently high to meet the cooling requirement of the reactor 12. Under these conditions additional cooling of the reactor may be required and, to achieve this, cold water 40 from a cooling tower 42, optionally with make-up water 44, is fed to additional cooling coils 46 producing hot water 48 which is returned to the cooling tower 42. Optionally a portion 50 of the hot water 48 is added to the lixiviant 24 which is directed to the heap.

Figure 2:
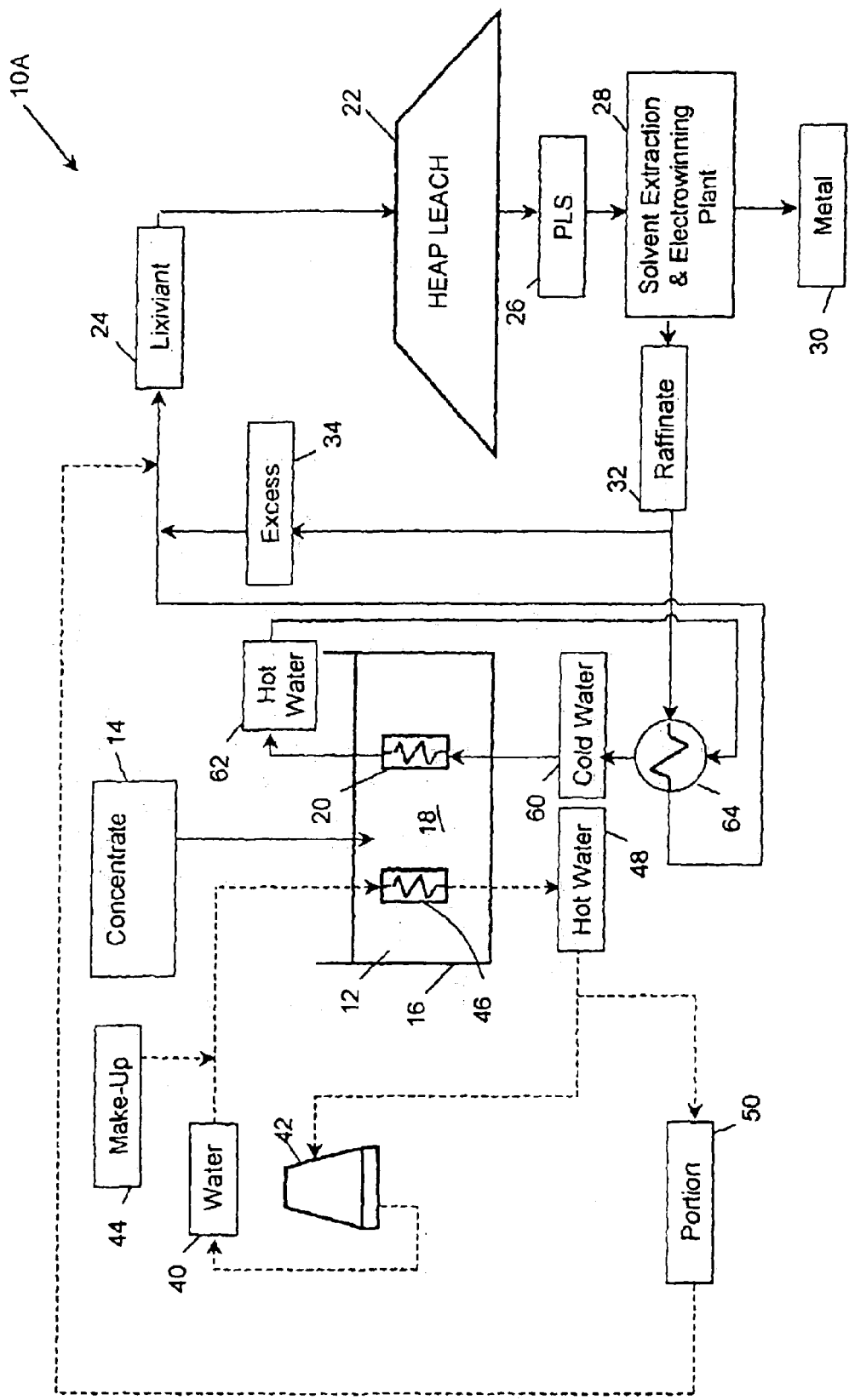
FIG. 2 illustrates an alternative process in which bioleaching of sulphide mineral concentrates and heap leaching of metal bearing sulphide ores are carried out in accordance with the principles of the invention.

FIG. 2 illustrates a plant 10A according to further example of the invention and, where applicable, like reference numerals are used to indicate components which are similar to corresponding components used in the arrangement of FIG. 1. The following description thus relates mainly to the differences between the two systems.

In the plant 10A of FIG. 2 the heat which is produced by the reaction process in the reactor 12, from the bioleaching of the sulphide concentrate 14, is removed using cooling coils 20 which are fed with cold water 60 thereby producing hot water 62. The hot water is fed to an external heat exchanger 64 in which heat is transferred from the hot water 62 to the solvent extraction raffinate 32. As is the case in the plant 10 the raffinate 32, in the plant 10A, is used as the lixiviant 24 for leaching the heap 22.

Optionally, if the flow of solvent extraction raffinate 32 is higher than that required for the duty of the heat exchanger 64 then the excess 34 is diverted directly to the lixiviant 24.

Figure 3:
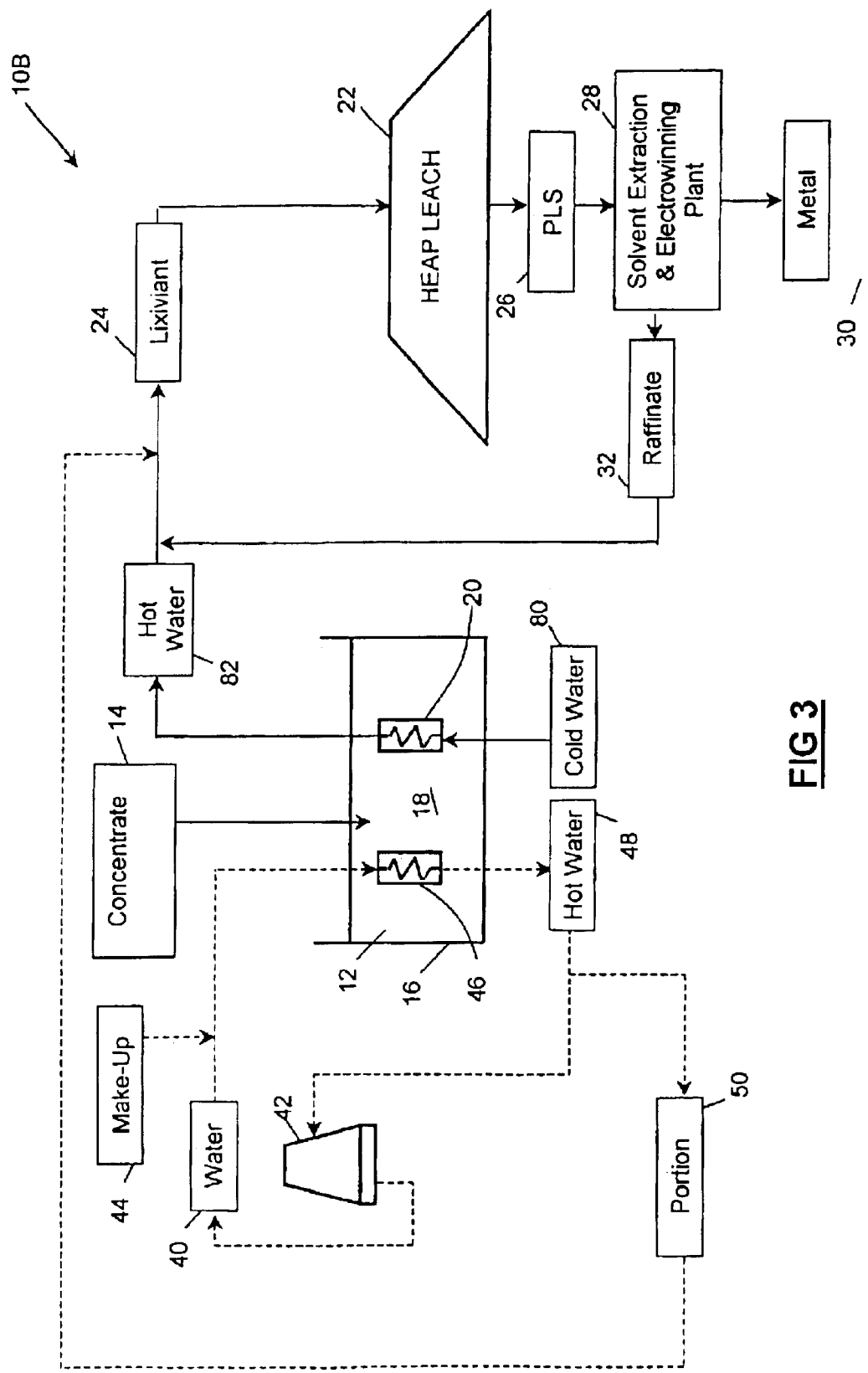
FIG. 3 illustrates another alternative process in which bioleaching of sulphide mineral concentrates and heap leaching of metal bearing sulphide ores are carried out in accordance with the principles of the invention.

FIG. 3 illustrates a plant 10B according to another form of the invention. Again like reference numerals are used to indicate like components.

In the plant 10B cold water 80 is fed to the cooling coils 20 in the reactor vessel to produce hot water 82. The hot water is used in making up the solvent extraction raffinate 32 to form the lixiviant 24 for the heap 22.

It is apparent from the preceding examples that the heat generated in the reactor vessel or vessels, by the leaching process which takes place therein, may be transferred to a heap leach in a variety of ways.

In many heap leach operations it is a requirement to introduce oxygen, generally in the form of air, into the heap. This opens a door to a further possibility in that the air which is destined for the heap 22 can be heated through a heat exchange process by the heat energy which is generated in the reactor 12. The temperature of the heap 22 can therefore be raised by means of hot air, by heating the lixiviant, or by making use of both processes.

What is claimed:

1. A method of leaching a sulphide mineral comprising:
   a. bioleaching a slurry of a sulphide mineral concentrate in at least one reactor;
   b. extracting heat from the slurry during the bioleaching;
   c. transferring the extracted heat into a heap in which bio-assisted leaching of a sulphide ore takes place.

2. A method according to claim 1 wherein the amount of heat energy transferred to the heap in which bio-assisted leaching takes place is related to the volume of the heap to allow the temperature of the heap to be increased to optimize the leaching rate.

3. A method according to claim 1 wherein the heat energy is transferred into the heap by heating fluid in at least one heat exchanger which is associated with the reactor and then directing the heated fluid to the heap.

4. A method according to claim 3 wherein the at least one heat exchanger includes a cooling coil inside a tank of the reactor.

5. A method according to claim 3 wherein the fluid is raffinate from a plant which is used to treat pregnant liquid solution from the heap and, after heating, the raffinate is returned to the heap as a lixiviant.

6. A method according to claim 3 wherein the fluid is water.

7. A method according to claim 6 wherein the heated water is added to raffinate from a plant which is used to treat pregnant liquid solution from the heap and the heated water and the raffinate are directed to the heap as a lixiviant.

8. A method according to claim 3 wherein the fluid is a gaseous medium.

9. A method according to claim 1 wherein the heat energy is extracted from the at least one reactor in a suitable medium and is transferred from the medium through one or more heat exchangers to a fluid which is passed into or through the heap.

10. A method according to claim 9 wherein the fluid is air which is directed into the heap to raise its temperature.

11. A method according to claim 9 wherein the fluid is raffinate produced by solvent extraction and the raffinate, once heated, is returned to the heap as a lixiviant.

12. A method according to claim 1 wherein water is passed through at least one cooling coil situated in the at least one reactor and heated water produced thereby is mixed with a solvent extraction raffinate from the heap to form a lixiviant for the bio-assisted heap leach.

13. A method according to claim 12 wherein, if the volume of solvent extraction raffinate is insufficient for the requirement for complete heat transfer to maintain the temperature of the at least one reactor at a desired level, the at least one reactor is partially cooled using water.

14. A method according to claim 12 wherein, if the volume of solvent extraction raffinate is surplus for the requirement for complete heat transfer to maintain the temperature of the at least one reactor at a desired level, then part of the raffinate is passed directly to the bio-assisted heap leach, with the balance being used for heat transfer out of the at least one reactor.

15. A method according to claim 1 wherein the at least one reactor is an agitated tank reactor.

16. A method according to claim 1 wherein the at least one reactor is operated using extreme thermophile microorganisms at a temperature in excess of 60° C.

17. A method according to claim 16 wherein the at least one reactor is operated at a temperature in the range of from 60° C. to 80° C.

18. A method according to claim 17 used for the bio-assisted heap leaching of chalcopyrite ores wherein the temperature of the heap is maintained above 60° C.

19. A method according to claim 18 wherein the at least one reactor is operated at a temperature at or in excess of 68° C. using extreme thermophile microorganisms and the heap is operated at a temperature above 60° C. using extreme thermophile microorganisms.

20. A method according to claim 1 wherein the sulphide material concentrate is selected from copper, nickel, zinc and gold and other sulphide concentrates.

21. A method according to claim 1 wherein at least a first sulphide mineral concentrate is leached in the at least one reactor and at least a second sulphide mineral concentrate is bio-leached in the heap.

22. A method according to claim 1 wherein the at least one reactor is operated at a temperature in the range of from 45° C. to 60° C. with moderate thermophile microorganisms while, in the heap, which is at a lower temperature, mesophile or moderate thermophile microorganisms are used.

* * * * *